United States Patent

Rumanowski

[15] 3,661,552
[45] May 9, 1972

[54] PROCESS FOR THE CONTROL OF PLANT GROWTH WITH SUBSTITUTED N,N'-BIS(HALOACETYL)-O-PHENYLENE DIAMINES

[72] Inventor: Edmund J. Rumanowski, Dover, N.J.
[73] Assignee: Tenneco Chemicals, Inc.
[22] Filed: Sept. 23, 1970
[21] Appl. No.: 74,935

Related U.S. Application Data

[62] Division of Ser. No. 677,853, Oct. 25, 1967, Pat. No. 3,557,221.

[52] U.S. Cl. ..................................71/118, 71/105
[51] Int. Cl. ...............................................A01n 9/20
[58] Field of Search.....................................71/118

[56] References Cited

UNITED STATES PATENTS 3,557,210   1/1971   Hamm et al. ............................71/118

OTHER PUBLICATIONS

Chemical Abstracts, Vol. 6, p. 1903 (Bogert et al.)
Chemical Abstracts, Vol. 22, Col. 1356–57, (Phillips)
Chemical Abstracts, Vol. 25, Col. 4556, (F. G. Farbenind, British Patent 343,744)
Chemical Abstracts, Vol. 25, Col. 4265, (Phillips)
Chemical Abstracts, Vol. 38, Col. 730, (Frisch et al.)
Chemical Abstracts, Vol. 44, Col. 1431–33, (Everett et al.)
Chemical Abstracts, Vol. 46, Col. 90–91, (Arora et al.)
Chemical Abstracts, Vol. 47, Col. 51, Col. 12917–18, (Gillespie et al.)
Chemical Abstracts, Vol. 52, Col. 12211 (Tricerri et al.)
Chemical Abstracts, Vol. 52, Col. 7179 (Cho-Tung Tu et al.)

*Primary Examiner*—James O. Thomas, Jr.
*Attorney*—Daniel J. Reardon, Barry G. Magidoff and Evelyn Berlow

[57] ABSTRACT

Compounds having the structural formula

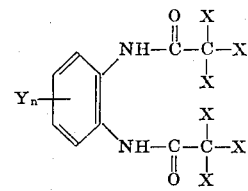

wherein each X represents hydrogen, chlorine, or fluorine and each Y represents halogen, lower alkyl, lower alkoxy, cyano, trifluoromethyl, or nitro, and $n$ represents an integer in the range of zero to four; are useful as preemergence and postemergence selective herbicides. Illustrative of these compounds are N,N'-bis(trichloroacetyl)-4,5-dichloro-o-phenylene diamine, N,N'-bis(chloroacetyl)-4,5-dichloro-o-phenylene diamine, and N,N'-bis(trifluoroacetyl)-3,4,5-tribromo-o-phenylene diamine.

10 Claims, No Drawings

PROCESS FOR THE CONTROL OF PLANT GROWTH WITH SUBSTITUTED N,N'-BIS(HALOACETYL)-O-PHENYLENE DIAMINES

This is a division of my copending application Ser. No. 677,853, which was filed on Oct. 25, 1967 which is now U.S. Pat. No. 3,557,221.

This invention relates to a process for the control of plant growth. More particularly, it relates to a process wherein substituted N,N'-bis(haloacetyl)-o-phenylene diamines are used to control or inhibit plant growth.

In accordance with this invention, it has been discovered that certain substituted N,N'-bis(haloacetyl)-o-phenylene diamines have unusual and valuable activity as selective herbicides. These compounds may be represented by the structural formula

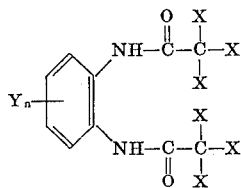

wherein each X represents hydrogen, chlorine, or fluorine and each Y represents chlorine, bromine, iodine, fluorine, an alkyl group having one to four carbon atoms, an alkoxy group having one to four carbon atoms, a cyano group, a trifluoromethyl group, or a nitro group, and $n$ represents an integer in the range of zero to four. The preferred composition for use as herbicides are those in which at least two and preferably four or more of the X substituents represent chlorine or fluorine and the Y substituents represent chlorine or bromine atoms in the 4 and 5 positions of the aromatic ring. Illustrative of these compounds are N,N'-bis(chloroacetyl)-4,5-dichloro-o-phenylene diamine, N,N'-bis(trichloroacetyl)-4,5-dichloro-o-phenylene diamine, N,N'-bis(trifluoroacetyl)-4,5-dibromo-o-phenylene diamine, N,N'-bis(difluorochloroacetyl)-3,4,5-trichloro-o-phenylene diamine, and the like.

The substituted N,N'-bis(haloacetyl)-o-phenylene diamines of this invention may be prepared by any suitable and convenient procedure. For example, they may be prepared by reacting the appropriate o-phenylene diamine with a substantially equivalent amount of acetic chloride, a haloacetyl chloride, acetyl anhydride, a haloacetic anhydride, or a mixture of these compounds. If desired, an excess of about 5 to 30 percent of acetyl chloride or the acetic anhydride may be used. The reaction may be carried out in the absence of a solvent or in the presence of a hydrocarbon or ether, such as heptane, toluene, xylene, or isopropyl ether. Particularly satisfactory results have been obtained by mixing an o-phenylene diamine with a slight excess of a haloacetic anhydride, such as trifluoroacetic anhydride, at a temperature below about 40° C. and then heating the mixture at a temperature in the range of about 60° to 100° C. until the reaction has been completed.

The substituted N,N'-bis(haloacetyl)-o-phenylene diamines may be applied to a wide variety of plants to control or inhibit their growth. They may be used to control the growth of weeds in an area containing a crop, or they may be used to destroy all plant growth in an area. They may be applied to the soil or other medium normally supporting plant growth to control or inhibit the growth of plants therein, or they may be applied to plants to control their growth.

While the substituted N,N'-bis(haloacetyl)-o-phenylene diamines may be used as such in the processes of this invention, they are usually and preferably used in combination with an inert carrier that facilitates the dispensing of dosage quantities of the herbicide and assists in its absorption by the plant whose growth is to be controlled. The herbicidal compounds may be mixed with or deposited upon inert particulate solids, such as fuller's earth, talc, diatomaceous earth, hydrated calcium silicate, kaolin, and the like to form dry particulate compositions. Such compositions may, if desired, be dispersed in water with or without the aid of a surface-active agent. The compounds are preferably dispensed in the form of solutions or dispersions in inert organic solvents, water, or mixtures of inert organic solvents and water or as oil-in-water emulsions. The concentration of the substituted N,N'-bis(haloacetyl)-o-phenylene diamines in the herbicidal compositions may vary within wide limits and depends upon a number of factors, the most important of which are the type or types of plants being treated and the rate at which the composition is to be applied. In most cases the composition contains approximately 0.1 percent to 85 percent by weight of one or more of the aforementioned substituted N,N'-bis(haloacetyl)-o-phenylene diamines. If desired, other pesticidal compounds may be also present in the compositions. The amount of the composition used is that which will provide the desired phytotoxic effect. Generally, it is used at a rate that will apply approximately 1 pound to 30 pounds and preferably 2 pounds to 10 pounds of the herbicidal compound per acre.

The invention is illustrated by the examples that follow. In these examples, all percentages are percentages by weight.

EXAMPLE 1

To a mixture of 8.9 grams (0.05 mole) of 4,5-dichloro-o-phenylene diamine and 100 ml. of toluene at 60°–65° C. was added 18.2 grams (0.1 mole) of trichloroacetyl chloride over a period of 10 minutes. The reaction mixture was heated at its reflux temperature for 6 hours, cooled to room temperature, and filtered. The crude product was washed with 25 ml. of toluene, then with 25 ml. of petroleum ether (20°–40° C.) and dried. There was obtained a 74 percent yield of N,N'-bis(trichloroacetyl)-4,5-dichloro-o-phenylene diamine, which melted at 240°–242° C. and which contained 59.4% Cl, 5.96% N, 25.3% C, and 0.83% H (calculated, 60.7% Cl, 6.0% N, 25.6% C, and 0.85% H). Infrared analysis of the product indicated that it contained the amide function.

EXAMPLE 2

A mixture of 8.9 grams (0.05 mole) of 4,5-dichloro-o-phenylene diamine, 11.1 grams (0.11 mole) of triethylamine, and 100 ml. of ethanol was maintained at 0° to 10° C. while 12.4 grams (0.11 mole) of chloroacetyl chloride was added to it over a period of 10 minutes. The reaction was warmed to room temperature, diluted with three times its volume of water, and filtered. The product obtained was recrystallized from ethanol. The N,N'-bis(chloroacetyl)-4,5-dichloro-o-phenylene diamine obtained melted at 153°–154° C. and contained 42.9% Cl, 8.49% N, 37.7% C, and 2.44% H (calculated, 43.0% Cl, 8.48% N, 36.4% C, and 2.42% H).

EXAMPLE 3

Twenty-five grams (0.12 mole) of trifluoroacetic anhydride was added to 8.9 grams (0.05 mole) of 4,5-dichloro-o-phenylene diamine over a period of 10 minutes during which the temperature of the mixture was not allowed to exceed 40° C. The reaction mixture was heated for 1 hour at 75°–80° C., cooled to room temperature, diluted with three times its volume of water, and filtered. The product was recrystallized from chloroform. The N,N'-bis-(trifluoroacetyl)-4,5-dichloro-o-phenylene diamine obtained melted at 155°–157° C. and contained 21.6% Cl, 7.4% N, 33.2% C, and 1.00% H (calculated 19.2% Cl, 7.6% N, 32.5% C, and 1.08% H).

EXAMPLES 4–18

Using the procedures described in Examples 1–3, a series of substituted N,N'-bis(acetyl)-o-phenylene diamines was prepared. The compounds prepared, the method used, and the properties of the products are set forth in Table I.

TABLE I

| Example Number | Compound | Method of preparation | Yield, percent | Melting point, °C | Cl, found | Cale. | N, found | Cale. | C, found | Cale. |
|---|---|---|---|---|---|---|---|---|---|---|
| 4 | N,N'-bis(acetyl)-4,5-dichloro-o-phenylene diamine. | Example 3 | 89 | 254°–255° (d.) | 27.1 | 27.2 | 10.8 | 10.7 | 45.7 | 46.0 |
| 5 | N,N'-bis(dichloroacetyl)-4,5-dichloro-o-phenylene diamine. | Example 1 | 85 | 210°–211° | 53.2 | 53.4 | 7.14 | 7.0 | 31.1 | 30.1 |
| 6 | N,N'-bis(difluorochloro)-4,5-dichloro-o-phenylene diamine. | Example 3 | 84 | 144°–146° | 34.4 | 35.3 | 7.45 | 6.97 | 31.5 | 29.9 |
| 7 | N,N'-bis(trichloroacetyl)-4,5-dimethyl-o-phenylene diamine. | Example 1 | 81 | 253°–255°(d.) | 48.3 | 49.9 | 6.68 | 6.56 | 34.9 | 33.7 |
| 8 | N,N'-bis(trifluoroacetyl)-4,5-dimethyl-o-phenylene diamine. | Example 3 | 82 | 168°–170° | | | 8.48 | 8.54 | 43.8 | 43.6 |
| 9 | N,N'-bis(trichloroacetyl)-4-chloro-o-phenylene diamine. | Example 1 | 72 | 220°–221° | 56.7 | 57.4 | 6.48 | 6.47 | 27.4 | 27.7 |
| 10 | N,N'-bis(trifluoroacetyl)-4-chloro-o-phenylene diamine. | Example 3 | 88 | 129°–130° | | | 8.33 | 8.36 | 35.5 | 35.8 |
| 11 | N,N'-bis(trifluoroacetyl)-4-nitro-o-phenylene diamine. | do | 60 | 102°–112° | | | 12.4 | 12.2 | 35.0 | 34.8 |
| 12 | N,N'-bis(trifluoroacetyl)-4-methoxy-o-phenylene diamine. | do | 78 | 133°–134°(d.) | | | 8.19 | 8.50 | 39.8 | 40.0 |
| 13 | N,N'-bis(trifluoroacetyl)-4-methyl-o-phenylene diamine. | do | 93 | 134°–136° | | | 8.94 | 8.9 | 42.2 | 42.0 |
| 14 | N,N'-bis(trifluoroacetyl)-4-carboxy-o-phenylene diamine. | do | 60 | | | | 7.95 | 8.14 | 38.1 | 38.3 |
| 15 | N,N'-bis(trichloroacetyl)-o-phenylene diamine. | Example 1 | 90 | 233°–234° | 53.3 | 53.4 | | | | |
| 16 | N,N'-bis(trifluoroacetyl)-o-phenylene diamine. | Example 3 | 83 | 157°–159° | | | 9.09 | 9.33 | | |
| 17 | N,N'-bis(trifluoroacetyl)-3-nitro-o-phenylene diamine. | do | 66 | 251°–253° | | | 12.0 | 12.2 | 34.4 | 34.8 |
| 18 | N,N'-bis(trifluoroacetyl)-3-nitro-5-chloro-o-phenylene diamine. | do | 70 | 166°–169° | 11.4 | 9.3 | 13.6 | 11.1 | 33.5 | 31.6 |

EXAMPLE 19

Aqueous solutions were prepared by dissolving 100 mg. portions of the products of Examples 1–18 in 10 ml. portions of acetone that contained 2,000 ppm of sorbitan trioleate and 5,000 ppm of a polyoxyethylene ether of sorbitan monooleate. The acetone solutions were dispersed in 90 ml. portions of distilled water to form aqueous solutions that contained 0.1 percent of the substituted N,N'-bis(haloacetyl)-o-phenylene diamines.

EXAMPLE 20

Series of tests were carried out in which compounds of this invention were evaluated as preemergence and postemergence selective herbicides. In the preemergence tests, solutions prepared by the procedure described in Example 19 were applied to groups of flats containing soil in which seeds of various plant species had been planted. The results of the tests were observed 10 days after the treatment. The postemergence tests were carried out by spraying seedlings of various plant species with solutions of the novel compounds and observing the results 43 days after treatment. In both series of tests the solutions were used in amounts that supplied 0.63 pound to 20 pounds of test compound per acre.

In Table II a numerical scale is used to show the herbicidal activity of the test compounds. On this scale, "1" indicates no injury to the plants; "2" indicates slight injury; "3" indicates moderate injury; "4" indicates severe injury; and "5" indicates that all of the plants were killed.

TABLE II
[Herbicidal activity of substituted N,N'-bis(haloacetyl)-o-phenylene diamines]

| Plant species | Clover | Soy bean | Sugar beet | Cotton | Corn | Oats | Mustard | Morning glory | Buckwheat | Rye grass | Crab grass | Yellow foxtail |
|---|---|---|---|---|---|---|---|---|---|---|---|---|
| Product of Example 1: | | | | | | | | | | | | |
| Preemergence: 20 lbs./acre | 3 | 1 | 2 | 2 | 2 | 1 | 3 | 2 | 1 | 1 | 3 | 1 |
| Postemergence: | | | | | | | | | | | | |
| 20 lbs./acre | 5 | 3 | 4 | 4 | 3 | 2 | 5 | 4 | 5 | 3 | 3 | 3 |
| 10 | 4 | 3 | 4 | 3 | 2 | 2 | 3 | 2 | 5 | 1 | 2 | 3 |
| 5 | 2 | 2 | 1 | 2 | 1 | 1 | 3 | 1 | 2 | 1 | 1 | 1 |
| Product of Example 3: | | | | | | | | | | | | |
| Postemergence: | | | | | | | | | | | | |
| 20 lbs./acre | 5 | 5 | 5 | 5 | 5 | 5 | 5 | 5 | 5 | 5 | 5 | 5 |
| 10 | 5 | 5 | 5 | 4 | 4 | 4 | 5 | 5 | 5 | 5 | 5 | 5 |
| 5 | 5 | 5 | 5 | 5 | 4 | 5 | 5 | 5 | 5 | 5 | 5 | 5 |
| 2.5 | 4 | 3 | 5 | 5 | 2 | 3 | 5 | 4 | 5 | 4 | 2 | 4 |
| 1.25 | 3 | 3 | 5 | 4 | 2 | 2 | 4 | 4 | 5 | 4 | 2 | 4 |
| 0.63 | 3 | 2 | 5 | 1 | 2 | 2 | 4 | 2 | 5 | 3 | 4 | 3 |
| Preemergence: | | | | | | | | | | | | |
| 20 lbs./acre | 4 | 1 | 5 | 4 | 1 | 1 | 4 | 1 | 1 | 4 | 5 | 4 |
| 10 | 3 | 1 | 5 | 3 | 1 | 1 | 3 | 1 | 1 | 4 | 5 | 4 |
| 5 | 3 | 1 | 5 | 1 | 1 | 1 | 3 | 1 | 1 | 2 | 3 | 2 |
| 2.5 | 3 | 1 | 2 | 1 | 1 | 1 | 2 | 1 | 1 | 1 | 4 | 3 |
| 1.25 | 1 | 1 | 2 | 1 | 1 | 1 | 2 | 1 | 1 | 1 | 1 | 1 |
| Product of Example 4: | | | | | | | | | | | | |
| Postemergence: 20 lbs./acre | 3 | 3 | 4 | 2 | 2 | 2 | 5 | 2 | 3 | 2 | 2 | 1 |
| Preemergence: 20 lbs./acre | 1 | 1 | 1 | 1 | 1 | 1 | 1 | 1 | 1 | 1 | 1 | 1 |
| Product of Example 6: | | | | | | | | | | | | |
| Postemergence: 20 lbs./acre | 5 | 4 | 5 | 5 | 4 | 5 | 5 | 5 | 5 | 5 | 5 | 5 |
| Preemergence: 20 lbs./acre | 4 | 1 | 5 | 1 | 1 | 2 | 5 | 1 | 3 | 3 | 4 | 4 |
| Product of Example 8: | | | | | | | | | | | | |
| Postemergence: 20 lbs./acre | 4 | 3 | 5 | 2 | 3 | 4 | 5 | 2 | 5 | 4 | 4 | 2 |
| Preemergence: 20 lbs./acre | 3 | 1 | 4 | 2 | 1 | 1 | 5 | 1 | 1 | 1 | 2 | 1 |
| Product of Example 10: | | | | | | | | | | | | |
| Postemergence: 20 lbs./acre | 5 | 5 | 5 | 5 | 4 | 5 | 5 | 5 | 5 | 5 | 5 | 5 |
| Preemergence: 20 lbs./acre | 4 | 1 | 5 | 1 | 1 | 1 | 2 | 1 | 1 | 1 | 4 | 3 |
| Product of Example 12: | | | | | | | | | | | | |
| Postemergence: 20 lbs./acre | 4 | 3 | 5 | 2 | 3 | 2 | 5 | 2 | 5 | 2 | 3 | 2 |
| Preemergence: 20 lbs./acre | 1 | 1 | 4 | 1 | 1 | 1 | 4 | 1 | 1 | 1 | 1 | 1 |
| Product of Example 13: | | | | | | | | | | | | |
| Postemergence: 20 lbs./acre | 5 | 2 | 5 | 3 | 3 | 3 | 5 | 3 | 5 | 5 | 5 | 3 |
| Preemergence: 20 lbs./acre | 5 | 1 | 5 | 2 | 2 | 1 | 5 | 1 | 1 | 1 | 5 | 3 |
| Product of Example 16: | | | | | | | | | | | | |
| Postemergence: 20 lbs./acre | 5 | 3 | 5 | 2 | 2 | 2 | 5 | 2 | 5 | 3 | 4 | 2 |
| Preemergence: 20 lbs./acre | 2 | 1 | 4 | 2 | 1 | 1 | 1 | 1 | 1 | 1 | 1 | 1 |
| Product of Example 18: | | | | | | | | | | | | |
| Postemergence: 20 lbs./acre | 5 | 5 | 5 | 5 | 5 | 5 | 5 | 5 | 5 | 5 | 5 | 4 |
| Preemergence: 20 lbs./acre | 5 | 1 | 5 | 2 | 1 | 4 | 5 | 3 | 1 | 3 | 4 | 4 |

Each of the other substituted N,N'-bis(haloacetyl)-o-phenylene diamines disclosed can be used in a similar manner to control or inhibit the growth of a wide variety of plants.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. The process for the control of plant growth in a locus which comprises treating the locus with a phytotoxic amount of a herbicidal compound having the structural formula

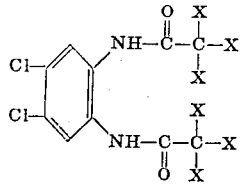

wherein each X represents hydrogen, chlorine, or fluorine, and at least two of the X substituents represent chlorine or fluorine.

2. The process of claim 1 wherein the herbicidal compound is N,N'-bis(trichloroacetyl)-4,5-dichloro-o-phenylene diamine.

3. The process of claim 1 wherein the herbicidal compound is N,N'-bis(chloroacetyl)-4,5-dichloro-o-phenylene diamine.

4. The process of claim 1 wherein the herbicidal compound is N,N'-bis(trifluoroacetyl)-4,5-dichloro-o-phenylene diamine.

5. The process of claim 1 wherein the herbicidal compound is N,N'-bis(difluorochloroacetyl)-4,5-dichloro-o-phenylene diamine.

6. The process for the control of the growth of plants which comprises contacting said plants with a phytotoxic amount of a herbicidal compound having the structural formula

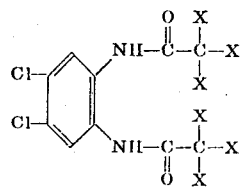

wherein each X represents hydrogen, chlorine, or fluorine, and at least two of the X substituents represent chlorine or fluorine.

7. The process of claim 6 wherein the herbicidal compound is N,N'-bis(trichloroacetyl)-4,5-dichloro-o-phenylene diamine.

8. The process of claim 6 wherein the herbicidal compound is N,N'-bis(chloroacetyl)-4,5-dichloro-o-phenylene diamine.

9. The process of claim 6 wherein the herbicidal compound is N,N'-bis(trifluoroacetyl)-4,5-dichloro-o-phenylene diamine.

10. The process of claim 6 wherein the herbicidal compound is N,N'-bis(difluorochloroacetyl)-4,5-dichloro-o-phenylene diamine.

* * * * *